(12) United States Patent
Yang (10) Patent No.: US 8,783,724 B2
(45) Date of Patent: Jul. 22, 2014

(54) GAS EXHAUST DEVICE FOR RETRACTOR PRETENSIONER FOR VEHICLE

(71) Applicant: Hyundai Motor Company, Seoul (KR)

(72) Inventor: Hyun Mo Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/851,342

(22) Filed: Mar. 27, 2013

(65) Prior Publication Data

US 2014/0102329 A1  Apr. 17, 2014

(30) Foreign Application Priority Data

Oct. 15, 2012  (KR) .................. 10-2012-0113937

(51) Int. Cl.
*B60R 22/46*  (2006.01)

(52) U.S. Cl.
CPC ..... *B60R 22/4633* (2013.01); *B60R 2022/4661* (2013.01)
USPC .......................................... 280/806; 297/477

(58) Field of Classification Search
CPC  B60R 22/46; B60R 22/4628; B60R 22/4633; B60R 22/4652; B60R 22/195; B60R 22/1954; B60R 22/1955; B60R 22/1956; B60R 2022/4661
USPC ........................... 280/806; 297/476, 477, 480
See application file for complete search history.

(56) References Cited

U.S. PATENT DOCUMENTS

| 5,842,344 | A * | 12/1998 | Schmid ........................... 60/632 |
| 6,340,176 | B1 * | 1/2002 | Webber et al. ................ 280/806 |
| 6,575,498 | B2 * | 6/2003 | Nagata et al. ................. 280/806 |
| 6,932,324 | B2 * | 8/2005 | Biller et al. .................... 254/230 |
| 7,500,632 | B2 * | 3/2009 | Ono et al. ...................... 242/374 |
| 2011/0140501 | A1 * | 6/2011 | Shiotani et al. ................ 297/474 |
| 2012/0013111 | A1 * | 1/2012 | Nagata et al. ................. 280/806 |

FOREIGN PATENT DOCUMENTS

| JP | 10067300 A | 3/1998 |
| JP | 2010-030332 A | 2/2010 |
| KR | 10-2008-0065353 | 7/2008 |
| KR | 10-0898002 | 5/2009 |
| KR | 10-0898003 | 5/2009 |

* cited by examiner

*Primary Examiner* — Drew Brown
(74) *Attorney, Agent, or Firm* — Edwards Wildman Palmer LLP; Peter F. Corless (57) ABSTRACT

Disclosed herein is a gas exhaust device of a retractor pretensioner for a vehicle, including a pinion connected to a belt weaving spool in a retractor body; a rack linearly transferred when engaged with the pinion; a rack transfer path formed between a pretensioner body and the retractor body, configured to guide the rack linearly toward the pinion; and a micro-gas generator (MGG) mounted on a side of a lower end of the pretensioner body to elevate the rack toward the pinion using gas generated by the MGG, wherein a gas moving aperture is formed to allow communication between an upper portion and a lower portion of the rack transfer path in a longitudinal direction in the rack, to elevate the rack using the gas generated from the MGG and simultaneously, move the rack toward the upper portion of the rack transfer path through the gas moving aperture.

3 Claims, 7 Drawing Sheets

GAS EXHAUST DEVICE FOR RETRACTOR PRETENSIONER FOR VEHICLE

CROSS-REFERENCE

This application claims under 35 U.S.C. §119(a) the benefit of Korean Patent Application No. 10-2012-0113937 filed on Oct. 15, 2012, the entire contents of which are incorporated herein by reference.

BACKGROUND (a) Technical Field

The present disclosure generally relates to a gas exhaust device of a retractor pretensioner for a vehicle, and more particularly, to a gas exhaust device of a retractor pretensioner for a vehicle, in which gas exhaust of a micro-gas generator (MGG) can be smoothly performed after the retractor pretensioner operates.

(b) Background Art

Generally, a vehicle seat belt (e.g., safety belt) is known as the most important safety device which locks withdrawal of a belt from a retractor during a vehicle collision or during a sudden stop of the vehicle to prevent a driver or a passenger from falling forward or sliding underneath the seat belt. The seat belt is locked to prevent withdrawal of the seat belt by the locking operation of the retractor, however during the short time between collision and belt locking, the belt is withdrawn without being locked, such that the driver or passenger may collide with front glass or a side of a door.

Therefore, a seat belt pretensioner is installed which instantly winds up the seat belt during vehicle collision, thereby increasing a tension working on the seat belt to a predetermined level to minimize a push of the driver or passenger during collision to reduce injury.

Figure 4A:
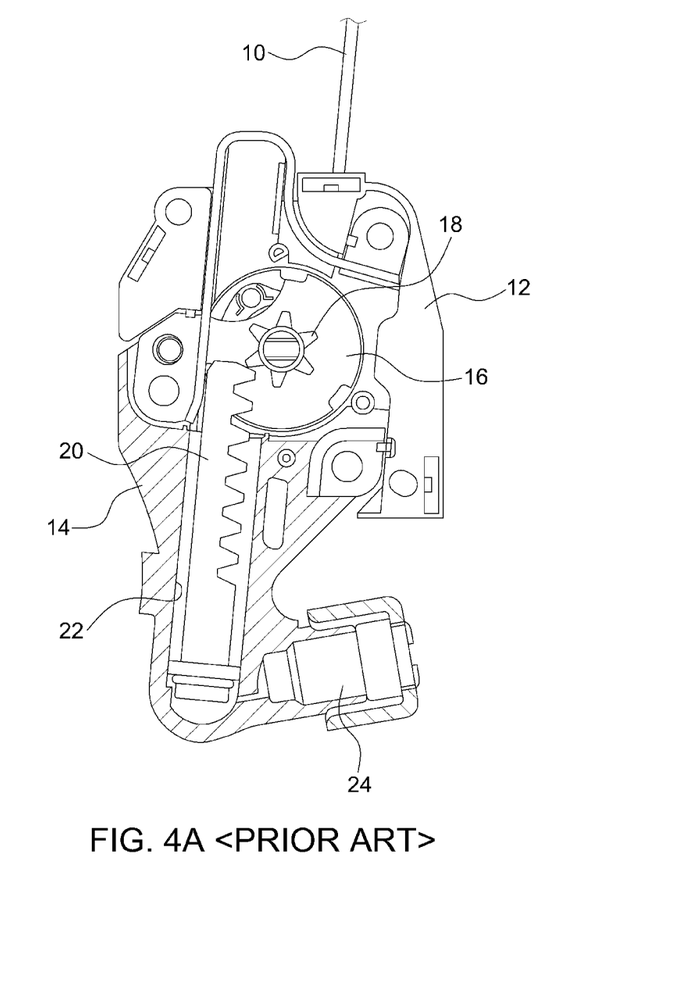
FIGS. 4A through 4C are exemplary cross-sectional views illustrating a conventional retractor pretensioner for a vehicle and operation flow thereof according to prior art.
Figure 4B:
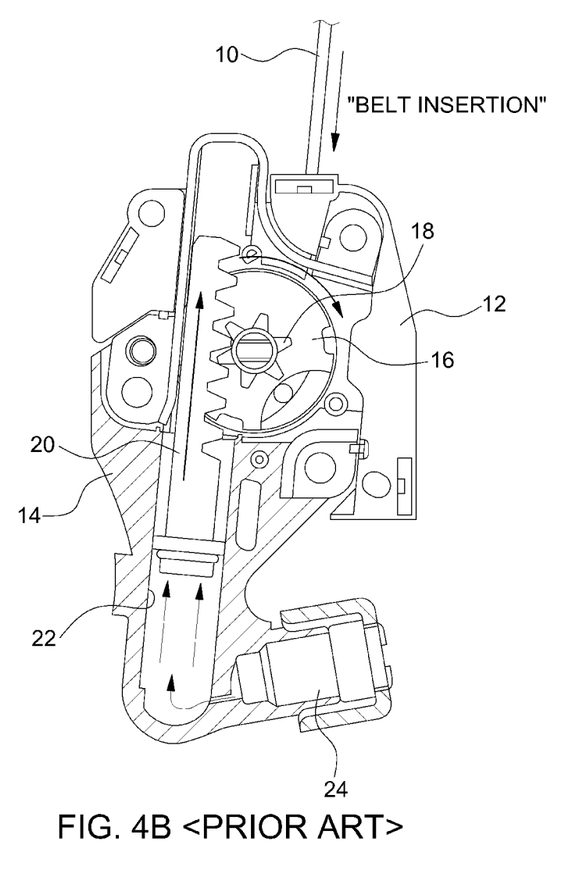
Figure 4C:
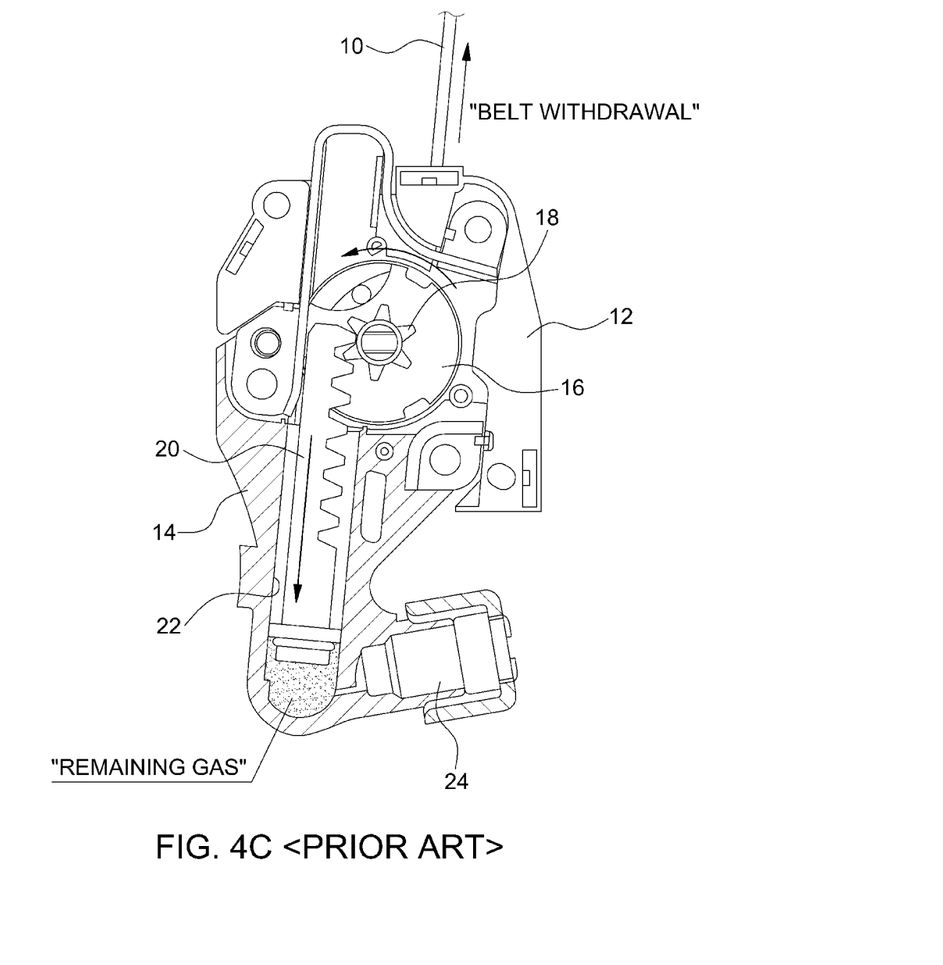

As illustrated in FIGS. 4A through 4C, a conventional pretensioner is fixed in a retractor on which a seat belt 10 is wound. The pretensioner includes a retractor body 12 in which a belt weaving spool 16 is disposed and on which the seat belt 10 is wound, a pretensioner body 14 connected integrally with a lower end portion of the retractor body 12, a pinion 18 connected to the belt weaving spool 16 in the retractor body 12, a rack 20 configured to move linearly when engaged with the pinion 18, a rack transfer path 22 formed between the pretensioner body 14 and the retractor body 12 to define a linear transfer section of the rack 20 and configured to guide the rack 20 along a linear transfer path, and a micro-gas generator (MGG) 24 mounted on a side of a lower end of the pretensioner body 14 to generate a gas and elevate the rack 20 upon releasing the gas during MGG operation.

The operation of the conventional pretensioner is described below.

In response to a collision sensor (not shown) installed on a front side of a vehicle sensing a vehicle collision, a controller sends an operating signal to the MGG 24. Thereafter, a gas is released based on operation of the MGG 24, and the rack 20 is elevated by the pressure of the released gas along the rack transfer path 22. Further, the pinion 18 is rotated in a reverse direction to wind up the belt 10 on the spool 16 simultaneously rotating in a reverse direction, thereby inserting the seat belt 10 into the spool 16 of the retractor by a predetermined length.

Moreover, with the expansion force of the gas generated by operation of the MGG 24 simultaneously with sensing of the vehicle collision by the collision sensor, the seat belt 10 is instantly wound up on the spool 16, thereby protecting a driver or passenger. After the seat belt 10 is instantly wound up by operation of the pretensioner, the spool 16 is rotated in a forward direction to alleviate a pressure on the chest portion of the driver or passenger, thereby withdrawing the seat belt 10.

However, after the retractor pretensioner operates, the lowering of the rack 20 is not performed smoothly due to the remaining gas pressure in the pretensioner body. In other words, the remaining gas pressure in the closed rack transfer path 22 between the lower end of the rack 20 and the MGG 24, prevents a forward direction rotation of the spool 16, causing overshoot in the load of the seat belt 10 which is to be withdrawn.

As shown in FIG. 4C, when the rack 20 is lowered by a forward direction rotation of the pinion 18 simultaneously with a forward direction rotation of the spool 16, the remaining gas pressure in the closed rack transfer path 22 between the lower end of the rack 20 after elevation and the MGG 24 disrupts the lowering of the rack 20, causing overshoot in the load of the seat belt 10 which is to be withdrawn. Thus, since the seat belt 10 is not withdrawn after the pretensioner operates, the pressure on the chest portion of the passenger or driver is not adequately alleviated and rather, an injury on the chest portion may occur.

Figure 5:
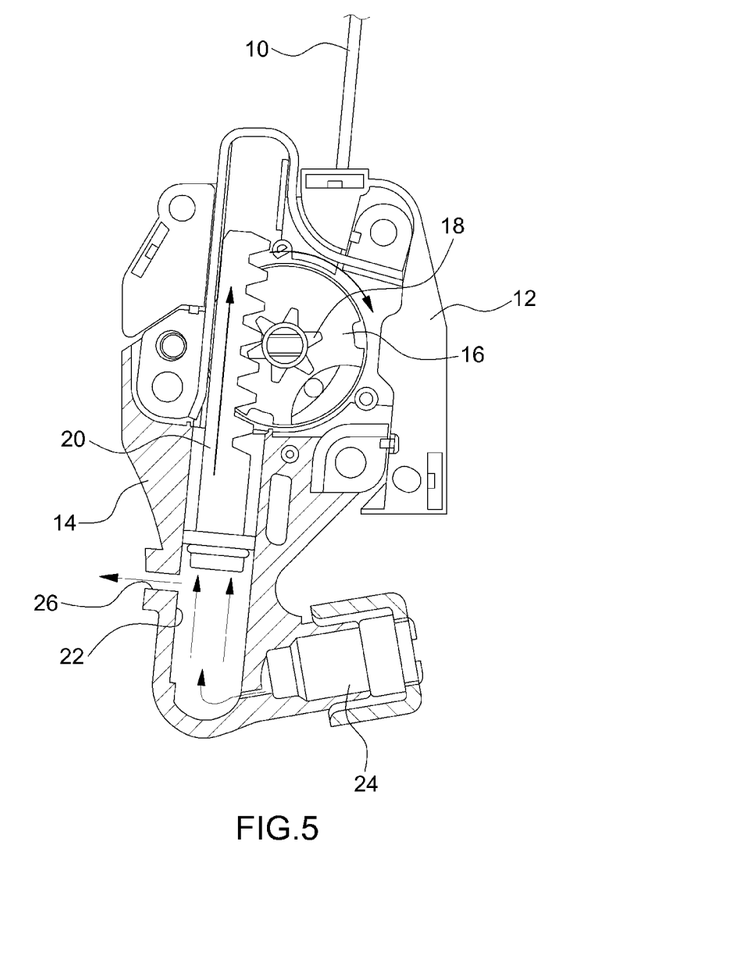
FIG. 5 is an exemplary view for describing a conventional pretensioner gas exhaust structure, according to prior art.

Meanwhile, as shown in FIG. 5, for smooth gas exhaust of the MGG when the pretensioner operates, a bent aperture 26 may be formed in the pretensioner body 14. In other words, the bent aperture 26 may be formed in the closed rack transfer path 22 between the lower end of the elevated rack 20 and the MGG 24 to alleviate overshoot in the load of the seat belt 10. However, the gas may be partially released to the exterior of the pretensioner through the bent aperture 26 during the operation of the pretensioner, such that the operation load of the pretensioner decreases.

SUMMARY

The present invention provides a gas exhaust device of a retractor pretensioner for a vehicle, in which after a retractor pretensioner operates, the remaining expanding gas from a micro-gas generator (MGG) may be released substantially smoothly, thereby preventing overshoot in a withdrawing load of a seat belt withdrawn by a remaining gas pressure after the operation of the pretensioner.

According to one embodiment of the present invention, a gas exhaust device of a retractor pretensioner for a vehicle may include a pinion connected to a belt weaving spool in a retractor body, a rack configured to move linearly when engaged with the pinion, a rack transfer path formed between a pretensioner body and the retractor body, and an MGG mounted on a side of a lower end of the pretensioner body to elevate the rack through gas generation, in which a gas moving aperture may be formed to allow communication between an upper portion and a lower portion of the rack transfer path in a longitudinal direction in the rack, thereby elevating the rack using the gas generated from the MGG and simultaneously moving the rack toward the upper portion of the rack transfer path through the gas moving aperture.

In addition, stopper may be separately mounted on a top end of the gas moving aperture of the rack to block and release the gas. The stopper may include an upper body moved vertically by a gas guiding aperture, the gas guiding aperture may be formed eccentrically with respect to the gas moving aperture of the rack, and a gas sealing end integrally formed on a bottom center portion of the upper body to be inserted in an engaged manner into an upper end of the gas moving aperture.

Furthermore, a gas exhaust aperture may be formed at a top end of the rack moving path may be formed a gas exhaust aperture to release the remaining gas after exhaustion through the gas moving aperture of the rack and the gas guiding aperture of the stopper.

After the rack is elevated along the rack transfer path, a fixing protrusion having an inverted triangular cross-section may be formed on an inner circumferential portion of the top end of the rack transfer path to automatically separate the stopper, and a stopping protrusion having a triangular cross-section may be formed at an edge of a top surface of the stopper to prevent fix the stopper above the fixing protrusion.

BRIEF DESCRIPTION OF THE DRAWINGS

The above and other features of the present invention will now be described in detail with reference to an exemplary embodiment thereof illustrated in the accompanying drawings which are given hereinbelow by way of illustration only, and thus are not limitative of the present invention, and wherein.

DESCRIPTION OF EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to the accompanying drawings to allow those of ordinary skill in the art to easily carry out the present invention.

The present invention intends to prevent overshoot in the withdrawing load of a seat belt to be withdrawn due to the remaining gas pressure after an operation of a retractor pretensioner by allowing a smooth gas release from a micro-gas generator (MGG) after the operation of the retractor pretensioner.

As described above with reference to FIGS. 4A through 4C, the conventional pretensioner is fixed in the retractor on which the seat belt 10 is wound and from which the seat belt 10 is released. The conventional pretensioner includes a retractor body 12 in which the belt weaving spool 16 is disposed onto which the seat belt 10 is wound, a pretensioner body 14 connected integrally to a lower end portion of the retractor body 12, a pinion 18 connected to the belt weaving spool 16 in the retractor body 12, a rack 20 configured to engage with the pinion 18 during linear motion, a rack transfer path 22 formed between the pretensioner body 14 and the retractor body 12 to define a linear transfer section of the rack 20 and is configured to guide the linear path of the rack 20, and a micro-gas generator (MGG) 24 mounted on a side of a lower end of the pretensioner body 14 to generate a gas and raise the rack 20 toward the pinion 18 upon releasing the gas during MGG operation.

Figure 1:
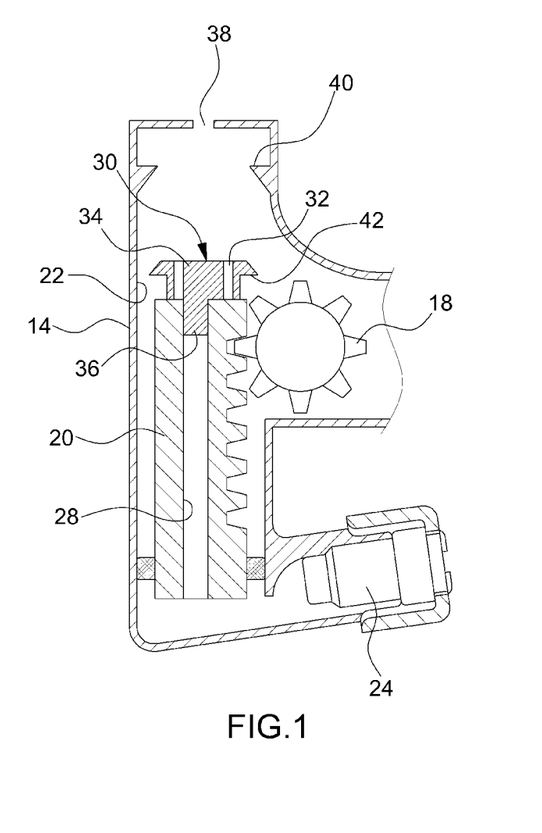
FIGS. 1 through 3 are exemplary cross-sectional views illustrating the structure and operation of a gas exhaust device of a retractor pretensioner for a vehicle according to an exemplary embodiment of the present invention.

According to the present invention, as illustrated in FIG. 1, a gas moving aperture 28 may be formed in the rack 20 to vertically move the rack 20 in a longitudinal direction, thereby allowing an upper portion and a lower portion of the rack transfer path 22 to communicate with each other via the gas moving aperture 28.

In one embodiment of the present invention, a stopper 30 may be separably mounted on a top end of the gas moving aperture 28 of the rack 20 to prevent a gas from being exhausted to the exterior of the pretensioner during the operation of the pretensioner and to allow the gas to be exhausted to exterior of the pretensioner after the operation of the pretensioner.

As further illustrated in FIG. 1, the stopper 30 may include an upper body 34 and a gas sealing end 36. In addition, a gas guiding aperture 32, may be formed eccentrically with respect to the gas moving aperture 28 and may be configured to vertically pass through the upper body 34 of the stopper 30. The gas sealing end 36 of the stopper 30 may protrude integrally from a bottom center portion of the upper body 34 to be inserted in an engaged manner into an upper end of the gas moving aperture 28.

Therefore, prior to the operation of the pretensioner, (i.e., the operation of the MGG 24) the gas sealing end 36 of the stopper 30 may be inserted into the upper end of the gas moving aperture 28 of the rack 20, providing a space between the lower end of the rack 20 and the MGG 24 and thereby, sealing the gas moving aperture 28 of the rack 20.

A structure may be disposed on the stopper 30 and on an inner circumferential portion of the upper end of the rack transfer path 22 to automatically separate the stopper 30 from the gas moving aperture 28 of the rack 20 when the exhaust of the remaining gas after the rack 20 is elevated along the rack transfer path 22 with the gas pressure due to the operation of the MGG 24.

Moreover, a fixing protrusion 40 having an inverted triangular cross-section may be formed on the inner circumferential portion of the top end of the rack transfer path 22, and a stopping protrusion 42 having a triangular cross-section may be formed at an edge of a top surface of the stopper 30, thus, when the stopper 30 is elevated together with the rack 20, the stopping protrusion 42 of the stopper 30 moves over the fixing protrusion 40 of the rack transfer path 22 thus stopping the stopper 30, and simultaneously separating the stopper 30 from the rack 20 as the rack 20 is lowered.

Furthermore, a gas exhaust aperture 38 may be formed at the top end of the rack moving path 22 to release the remaining gas after exhaustion through the gas moving aperture 28 and the gas guiding aperture 32 of the stopper 30 after separation of the stopper 30 from the gas moving aperture 28.

Figure 2:
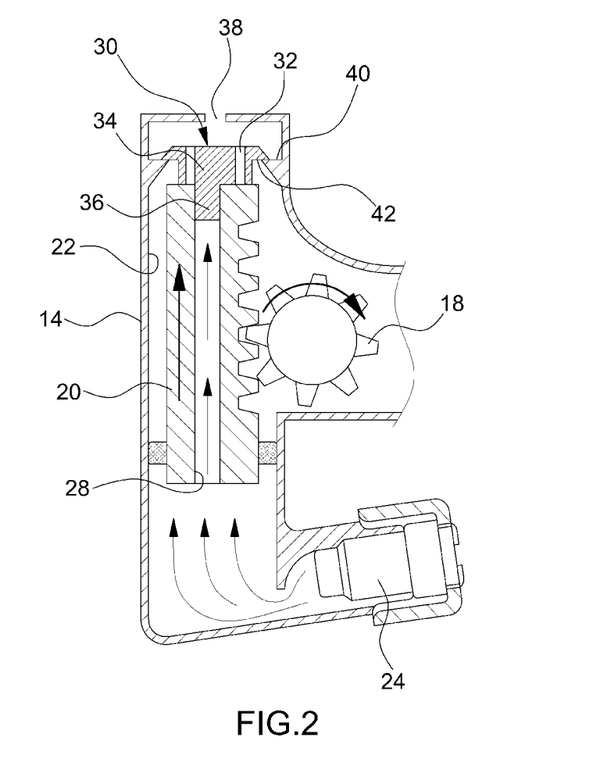
Figure 3:
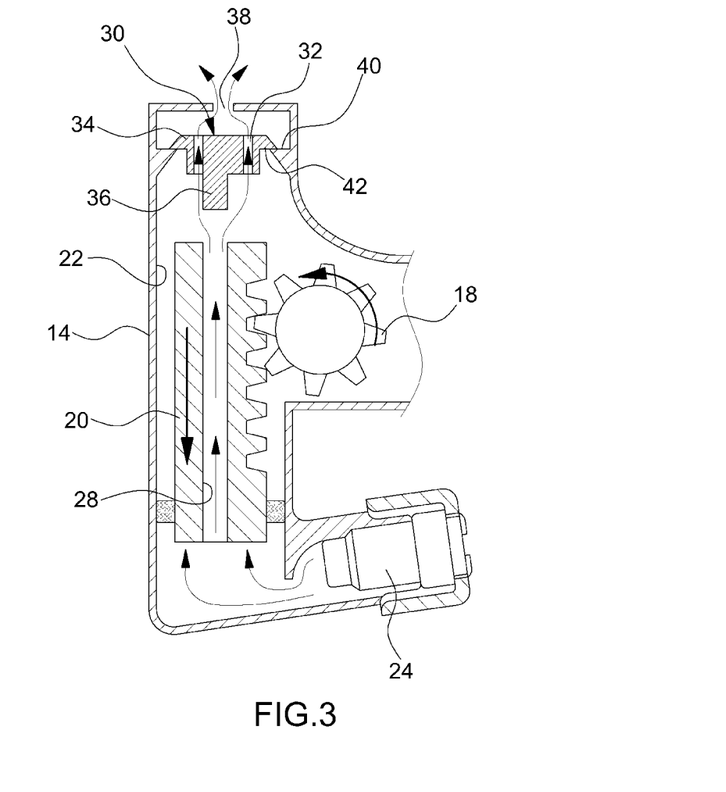

The operating flow of the gas exhaust device of the retractor pretensioner for a vehicle according to the present invention structured as described above will be described as below with reference to FIGS. 2-3.

In response to a collision sensor (not shown) installed on the front side of the vehicle sensing a vehicle collision, a controller may output an operation signal to the MGG 24 and the gas may be released due to the operation in the MGG 24, thereby elevating the rack 20 along the rack transfer path 22 by the pressure of the released gas.

Moreover, when the gas from the MGG 24 enters the gas moving aperture 28 of the rack 20, the rack 20 may be smoothly elevated by the gas pressure due to the stopper 30 stopping the gas moving aperture 28. Furthermore, since the rack 20 may be linearly moved and elevated, the pinion 18 may be rotated in a reverse direction to wind up the belt 10 and simultaneously, the spool 16 may be rotated in a reverse direction to collect and wind up the belt 10, thereby inserting the seat belt 10 into and around the spool 16 of the retractor by a predetermined length.

After the pretensioner operates to wind up the seat belt 10, thus protecting the passenger, the spool 16 may be rotated in a forward direction to release a predetermined length of the seat belt, thereby alleviating pressure on the chest portion of the driver or passenger.

Furthermore, when the rack 20 moves up to a top dead point of the rack transfer path 22 by the gas pressure from the MGG 24, the stopper 30, together with the rack 20, may be elevated to the maximum height. More specifically, the stopper 30 may move over the fixing protrusion 40 of the rack transfer path 22 thereby stopping the stopper 30, and simultaneously, separating the stopper 30 from the rack 20 as the rack 20 is lowered.

Therefore, the remaining gas in the gas moving aperture 28 of the rack 20 and in a space between the lower end portion of the rack 20 and the MGG 24 may be substantially easily released to the exterior of the pretensioner through the gas moving aperture 28 of the rack 20, the gas guiding aperture 32 of the separated stopper 30, and the gas exhaust aperture 38 of the rack moving path 22.

As the remaining gas is released and removed, the rack 20 may be lowered by the forward direction rotation of the pinion 18 simultaneously with the forward direction rotation of the spool 16, thereby preventing the remaining gas pressure in the rack transfer path 22 from disturbing the lowering of the rack 20.

If the rack 20 alone is lowered, the stopper 30 is locked and bound by the fixing protrusion 40 of the rack transfer path 22, thus being maintained separated from the rack 20. Therefore, when the vehicle is repaired at a repair shop due to a vehicle collision accident, reset repair may be performed to couple the stopper 30 to the rack 20 again, such that the rack 20 and the stopper 30 may be used again.

Therefore, conventionally, overshoot occurs in the load of the seat belt to be withdrawn; however, in the present invention, the rack 20 may be lowered by removing the remaining gas, thereby smoothly rotating the spool 16 in a forward direction and withdrawing the seat belt, alleviating the pressure on the chest portion of the passenger after the operation of the pretensioner and preventing an injury which may be caused by the seat belt pressure.

According to the present invention, the gas moving aperture may be formed in a longitudinal direction of the rack and the gas exhaust aperture may be formed on the upper end of the rack transfer path, to release the remaining expanding gas from the MGG substantially smoothly after the operation of the retractor pretensioner, thereby preventing occurrence of overshoot in the withdrawal load of the seat belt and preventing the injury of the chest portion of the passenger.

In particular, the stopper may be separably mounted on the top end of the gas moving aperture of the rack, to separate the stopper from the rack after the gas pressure is delivered to the rack, to allow communication between the gas moving aperture and the gas exhaust aperture, thereby smoothly elevating the rack without gas exhaust during the operation of the pretensioner.

Description of Reference Numerals

| | |
|---|---|
| 10: Belt | 12: Retractor Body |
| 14: Pretensioner Body | 16: Spool |
| 18: Pinion | 20: Rack |
| 22: Rack transfer Path | 24: Micro-Gas Generator (MGG) |
| 26: Bent Aperture | 28: Gas Moving Aperture |
| 30: Stopper | 32: Gas Guiding Aperture |
| 34: Upper Body | 36: Gas sealing End |
| 38: Gas Exhaust Aperture | 40: Fixing Protrusion |
| 42: Stopping Protrusions | |

What is claimed is:

1. A gas exhaust device of a retractor pretensioner for a vehicle, the gas exhaust device comprising:
    a pinion connected to a belt weaving spool in a retractor body;
    a rack linearly transferred when engaged with the pinion;
    a rack transfer path formed between a pretensioner body and the retractor body, configured to guide the rack linearly toward the pinion; and
    a micro-gas generator (MGG) mounted on a side of a lower end of the pretensioner body to elevate the rack toward the pinion using gas generated by the MGG,
    wherein a gas moving aperture is formed to allow communication between an upper portion and a lower portion of the rack transfer path in a longitudinal direction in the rack, to elevate the rack using the gas generated from the MGG and simultaneously, move the rack toward the upper portion of the rack transfer path through the gas moving aperture,
    wherein a stopper is separably mounted on a top end of the gas moving aperture of the rack to block and release the gas generated by the MGG
    wherein the stopper comprises:
        an upper body therein with a gas guiding aperture formed eccentrically with respect to the gas moving aperture of the rack; and
        a gas sealing end integrally formed on a bottom center portion of the upper body to be inserted in an engaged manner into an upper end of the gas moving aperture.

2. The gas exhaust device of claim 1, further comprising:
    a gas exhaust aperture formed at a top end of the rack moving path is formed to release the gas remaining after exhaustion through the gas moving aperture of the rack and the gas guiding aperture of the stopper.

3. The gas exhaust device of claim 1, wherein in response to the rack being elevated along the rack transfer path, a fixing protrusion having an inverted triangular cross-section is formed on an inner circumferential portion of the top end of the rack transfer path to automatically separate the stopper from the rack, and a stopping protrusion having a triangular cross-section is formed at an edge of a top surface of the stopper to fix the stopper on the fixing protrusion.

* * * * *